United States Patent Office 3,849,505
Patented Nov. 19, 1974

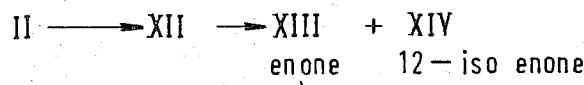
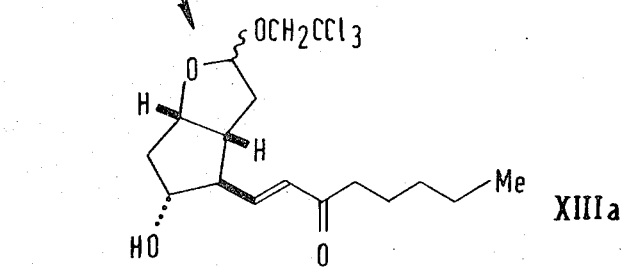
XIIIa
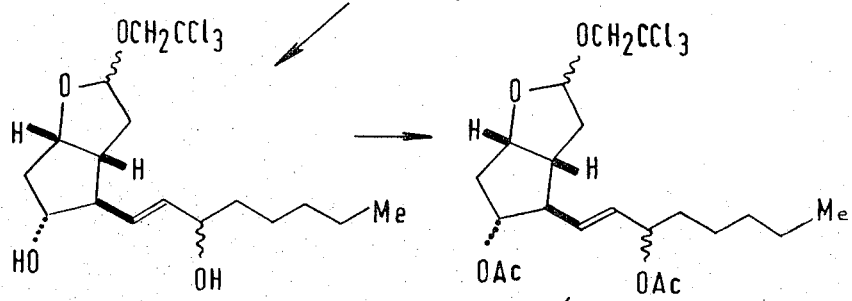
XVa     XVb
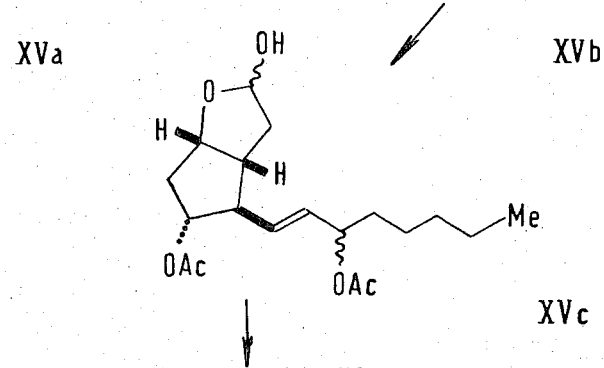
XVc
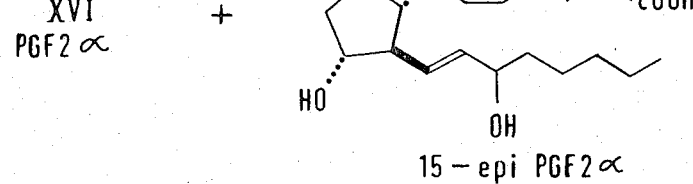
XVI
PGF2α   +   15-epi PGF2α

3,849,505
BICYCLIC POLYOLS
Stephen Turner, Swanland, England, assignor to Reckitt
& Colman Products Limited, Hull, Yorkshire, England
Filed Sept. 12, 1972, Ser. No. 288,385
Claims priority, application Great Britain, Sept. 24, 1971, 44,758/71
Int. Cl. C07c 35/22
U.S. Cl. 260—617 F                               1 Claim

ABSTRACT OF THE DISCLOSURE

The invention relates to novel compounds having the formula:

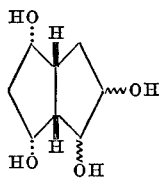

which can be used as starting materials in the production of prostaglandin compounds such as Prostaglandin F2α, and to processes for making these compounds. There is also described a novel synthesis for the production of Prostaglandin F2α.

---

This invention relates to compounds which may be used as intermediates in the preparation of prostaglandins such as prostaglandin F2α (PGF2α).

BRIEF SUMMARY OF THE INVENTION

According to this invention there are provided substituted bicyclo (3.3.0) octanes of the general formula:

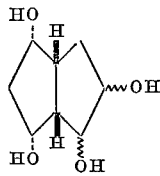

and in particular there is provided a compound of the formula:

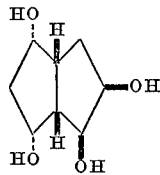

Figure 1:
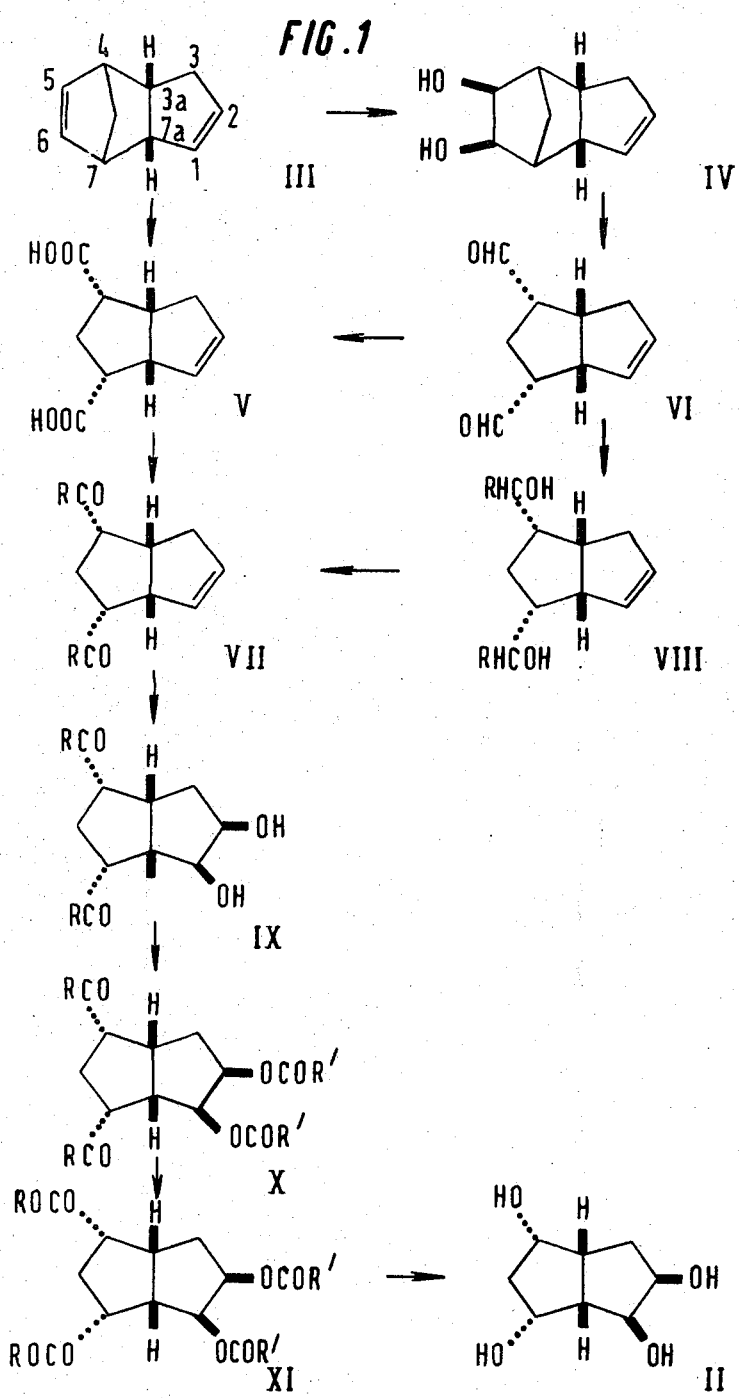

The compound of formula II may be prepared according to the scheme set forth in FIG. 1 of the accompanying drawing from the dicyclopentadiene (III). In the formulae R may be primary alkyl of 1 to 6 carbon atoms and R' may be aryl or primary alkyl of 1 to 6 carbon atoms. Conveniently R and R' are both methyl groups.

The invention also includes within its scope a process for the preparation of a compound as described above, wherein the sequential steps as shown in FIG. 1 of the drawings are carried out so that a compound of formula III is converted to the compound of formula II. It will be appreciated that in various stages set out in the scheme of FIG. 1 all the asymmetric compounds can be produced as racemic mixtures. By means of standard techniques the racemic mixtures can be resolved, whereupon subsequent products may be obtained as the corresponding optically pure enantiomers. In the scheme both enantiomeric forms as well as racemic forms are depicted by a single representation which should not however be considered to limit the scope of the disclosure.

Bergstrom and Sjovall in the specification of British Patent No. 1,040,544 describe the isolation and purification of prostaglandin F2α in milligram amounts from extracts of the vesicular glands of sheep. Subsequently biosynthetic methods have been developed for the manufacture of prostaglandins from certain fatty acids; however, these methods are liable to result in a mixture of products necessitating tedious purification techniques. Prostaglandins have been synthesised in the laboratory by means of multistage processes. Invariably there are drawbacks in these known syntheses. For example, the synthesis of Taub et al. (Chem. Comm. 1970, 1258) is a very long process. The shorter method of Corey et al. (JACS 1969, 91, 5675), on the other hand utilizes expensive and hazardous reagents and employs some labile intermediates (c.f. Corey JACS 1971, 93 1489).

Hence there is still a need for a versatile building block which is relatively easy and inexpensive to prepare in large quantities and from which a large variety of natural and purely synthetic prostaglandins may be prepared. Thus, for example, Prostaglandin F2α (PGF2α) may be prepared from the substituted bicyclo (3.3.0) octane of formula II according to the scheme of the accompanying FIG. 2; also a synthetic prostaglandin such as 20 ethyl PGF2α may be prepared by an analogous synthesis employing the compound of formula II.

Prostaglandin F2α has potent biological activity in a variety of physiological situations (see review article Weeks, Ann. Rev. Pharmacol. 1972, 317) and therapeutic uses in the field of gynecology and obstetrics (e.g. Embrey, B. M. J., 1972, 3, 146).

In carrying out the process for the preparation of the compound of formula II according to the scheme of FIG. 1, racemic endo-3a,4,7,7a-tetrahydro-4,7-methanoindene (III) is oxidized to give racemic 1β,5β-bicyclo-(3.3.0)-oct-2-ene-6α,8α-dicarboxylic acid (V). Oxidation may be carried out by the methods in themselves well known in the art, such as by employing ozone-oxygen followed by treatment with aqueous chromic acid/sulphuric acid.

In an alternative method for the preparation of (V) racemic endo-3a,4,7,7a-tetrahydro - 4,7 - methanoindene (III) is hydroxylated to give racemic 5exo, 6exo-dihydroxy-endo-3a,4,5,6,7,7a-hexahydro - 4,7 - methanoindene (IV), conveniently by using potassium permanganate in a mixed water/organic solvent medium. The resultant (IV) is cleaved with conventional reagents such as periodate ions in a one phase medium, or alternatively in a two phase medium of water and a water-immiscible organic solvent, to give racemic 6α,8α-diformyl-1β,5β-bicyclo-(3.3.0)-oct-2-ene (VI). Oxidation of (VI) with, for example, aqueous chromic acid/sulphuric acid gives racemic 1β,5β-bicyclo-(3.3.0)-oct-2-ene - 6α,8α - dicarboxylic acid (V).

Treatment of (V) with an alkyl metal reagent gives when R is methyl, racemic 6α,8α-diacetyl-1β,5β-bicyclo-(3.3.0)-oct-2-ene (VII; R=Me). Conveniently this preparation may be carried out by adding methyl lithium as an ethereal solution to a solution of (V) in pure, dry tetrahydrofuran.

Alternatively, (VII) may be prepared by treating (VI) with an alkyl metal reagent, such as when R is methyl, methyl magnesium iodide, and oxidising the resultant racemic 6α,8α-di(1' - hydroxyethyl) - 1β,5β - bicyclo- (3.3.0)-oct-2-ene compound (VIII; R=Me) with for example aqueous chromic acid/sulphuric acid or aqueous sodium dichromate/sulphuric acid.

Hydroxylation of (VII) with, for example, osmium tetroxide (a small excess) in benzene and pyridine, or by employing a catalytic amount of osmium tetroxide in the presence of an oxidising reagent such as sodium chlorate or potassium chlorate gives when R is methyl racemic $6\alpha,8\alpha$-diacetyl - $2\beta,3\beta$ - dihydroxy - $1\beta,5\beta$ - bicyclo-(3.3.0)-octane (IX; R=Me).

The alcohol groups of (IX) are then protected by methods well known in the art, for example by acylation with an acid anhydride $(R'CO)_2O$ or acid chloride R'COCl. Thus when R'=Me acetylation with acetic anhydride or acetyl chloride gives when both R and R' are methyl, racemic $2\beta,3\beta$-diacetoxy - $6\beta,8\alpha$ - diacetyl-$1\beta,5\beta$-bicyclo-(3.3.0)-octane (X; R=R'=Me).

Racemic $2\beta,3\beta,6\alpha,8\alpha$ - tetraacetoxy - $1\beta,5\beta$ - bicyclo-(3.3.0)-octane (XI; R=R'=Me) is obtained by Baeyer-Villiger oxidation of (X; R=R'=Me) using a per-acid such as perbenzoic acid, m-chloroperbenzoic acid, perphthalic acid, permaleic acid or pertrifluoracetic acid. Conveniently the oxidation is carried out in an inert solvent with a 0–20 mole excess of a peracid, such as m-chloroperbenzoic acid or permaleic acid in methylene chloride at reflux. Similarly the other protected derivatives of racemic $6\alpha,8\alpha$ - diacetyl 1 $2\beta,3b$ - dihydroxy - $1\beta,5\beta$ - bicyclo-(3.3.0)-octane (IX; R=Me) may be oxidized in a like fashion. Removal of the acyloxy groups by standard procedures, such as by hydrolysis with potassium hydroxide, potassium carbonate, or reduction with lithium aluminum hydride and the like, gives racemic $2\beta,3\beta,6\alpha,8\alpha$-tetrahydroxy - $1\beta,5\beta$ - bicyclo - (3.3.0) - octane (II). Thus racemic $2\beta,3\beta,6\alpha,8\alpha$ - tetraacetoxy - $1\beta,5\beta$ - bicyclo-(3.3.0)-octane (XI; R=R'=Me) treated with potassium carbonate in a solvent, for example methanol, gives racemic $2\beta,3\beta,6\alpha,8\alpha$ - tetrahydroxy - $1\beta, 5\beta$ - bicyclo - (3.3.0)-octane (II).

Figure 2:
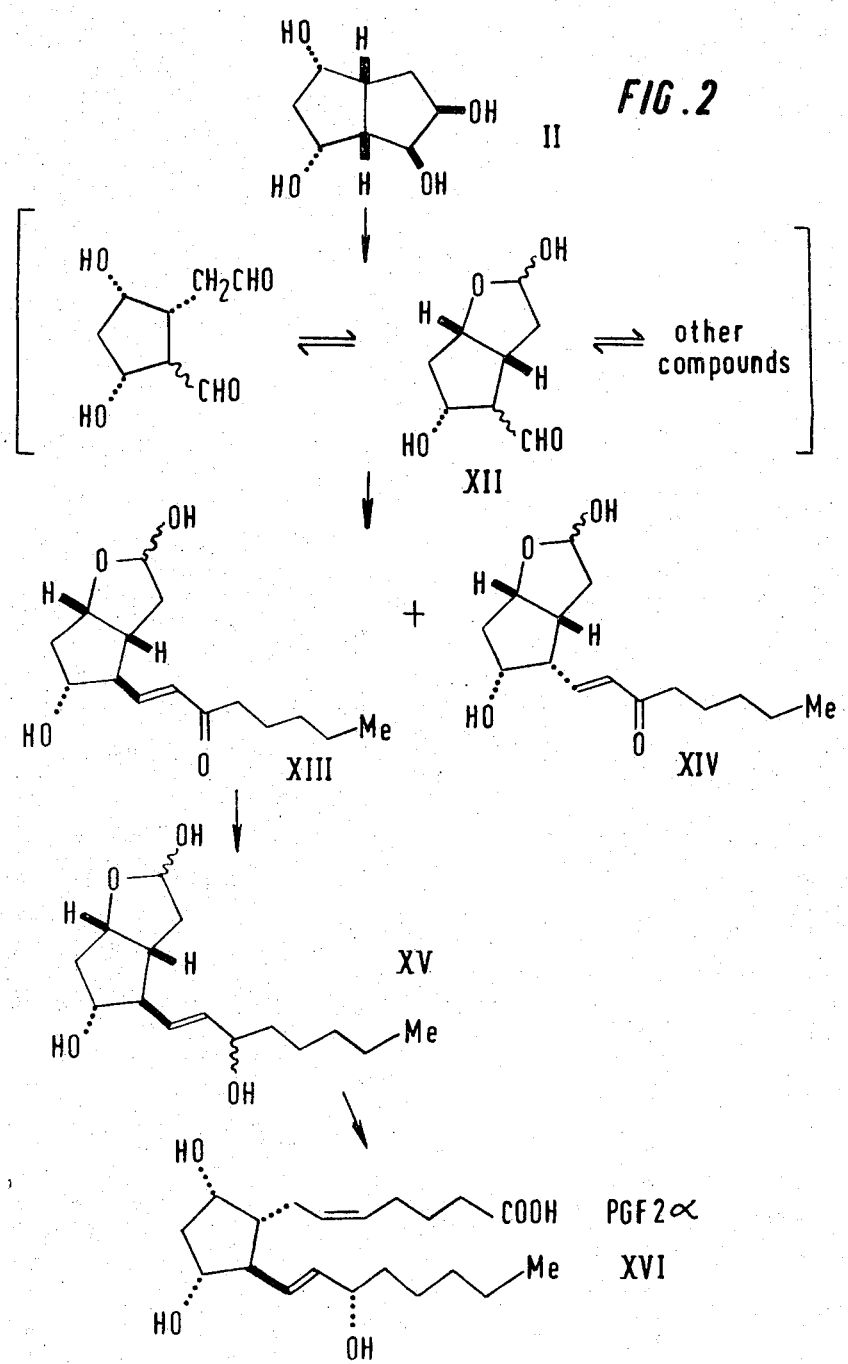

The invention also includes a process for the preparation of Prostaglandin F2α wherein the sequential steps as shown in FIG. 2 of the accompanying drawings are carried out so that a compound of Formula II is converted into Prostaglandin F2α. In carrying out the process for the preparation of prostaglandin F2α according to the scheme of FIG. 2 of the drawings, racemic $2\beta,3\beta,6\alpha,8\alpha$-tetra-hydroxy - $1\beta,5\beta$ - bicyclo - (3.3.0) - octane (II) when treated with convention vic-diol cleaving reagents yields the aldehyde material (XII) which exists as a mixture of compounds in equilibrium. Inorganic periodates may be used for the cleavage, or periodate ions associated with an ion-exchange resin, but in a preferred process the inorganic periodate is accompanied by a mildly basic substance such as potassium carbonate. This encourages epimerisation of the aldehyde group attached to the carbon atom which will become C.12 in the product prostaglandin.

The unstable aldehyde mixture (XII) is converted to the racemic enones (XIII) and (XIV) by a procedure similar to that of Corey (J.A.C.S., 1969, 91, 5675) and the enones are separated by methods well known in the art, such as chromatography, either on thin layers or in columns.

The enone (XIII) may be converted to racemic prostaglandin F2α by the route shown in the scheme of FIG. 2. Thus the enone (XIII) may be reduced with approximately the theoretical quantity of a reagent like sodium borohydride to give the racemic dihydroxy compound (XV) which can be converted to racemic prostaglandin F2α (XVI) by the procedures disclosed in the article by Fried et al. J.A.C.S., 1972, 94, 4342. (Compound 10 of the Fried article is compound XV the formula of which occurs in scheme 2 above.) However, because the preparation of the dihydroxy compound (XV) is accompanied by the formation of some impurities it is chemically expedient to protect the functional groups of the enone (XIII), using the route shown in the scheme of FIG. 3 of the drawings or a similar route for making prostaglandin F2α.

The hemi-acetal grouping of the enone (XIII) may be protected as an ether or as an ester. An ether, for example the trichloroethyl derivative (XIIIa), is formed by reacting (XIII) with an alcohol, for example trichloroethanol, in the presence of a catalyst such as p-toluene sulphonic acid. The esters, for example the monoacetate, may be made by reacting (XIII) with an anhydrous organic acid, for example, glacial acetic acid preferably in the presence of sodium acetate.

In the protected enone, for example the trichloroethyl derivative (XIIIa), the keto group is readily reduced without formation of undesired by-products. The reducing agent is chosen from reagents will known in the art, the choice depending on the nature of the group used to protect the hemi-acetal function. In a preferred route the protecting group is the trichloroethyl ether and the reducing agent is sodium borohydride, yielding the dihydroxy compound (XVa).

In the route of choice the alcohol groupings of dihydroxy compound (XVa) are protected. The nature of the protecting group utilized depends on which prostaglandins it is desired to make. For the synthesis of racemic prostaglandin $F_{2\alpha}$ the protecting group may be either an ester derived from an organic acid, it may be an ether, such as a tetrahydropyranyl ether, or it may be of another type usable in the prostaglandin field. For example the racemic diacetate (XVb) is prepared from the racemic dihydroxy compound (XVa) using acetic anhydride.

The hemi-acetal protecting group is next removed, the method used being chosen from those well known in the art such that other protecting groups in the compound are unaffected. In the instance of the diacetate (XVb) the trichloroethyl ether groupings may be removed by a catalyst, such as p-toluene sulphonic acid, in the presence of water, or it may be taken off by conventional procedures such as in the preferred method, reduction with zinc and acetic acid, giving the racemic hemi-acetal (XVc).

The free hemi-acetals of the type illustrated by compound (XVc) are converted to prostaglandins by methods related to those of Corey (J.A.C.S., 1969, 91, 5675). Thus the racemic hemi-acetal (XVc) reacts with the ylid formed from 5-triphenylphosphoniovaleric acid to give, after removal of the ester groupings by standard procedures, racemic prostaglandin F2α and racemic 15-epi prostaglandin F2α. These were separated and purified essentially by methods described elsewhere (Andersen, J. Lipid Res., 1969, 10, 316).

Accordingly it is to be understood that the invention also includes a process for the preparation of Prostaglandin F2α wherein the sequential steps as shown in FIG. 3 of the accompanying drawings are carried out so that a compound of Formula II is converted into Prostaglandin F2α.

The identity of the synthetic racemic prostaglandin F2α prepared as described above was established by comparison with natural prostaglandin F2α. The comparison utilised the techniques of infrared spectroscopy, mass spectrometry, thin layer chromatography, and vapour phase chromatography. The biological activity of the synthetic racemic prostaglandin F2α was confirmed by various assays against natural material.

SPECIFIC EMBODIMENTS

The following examples illustrate the preparation of the tetrahydroxy compound of formula II from the dicyclopentadiene of formula III (Preparations 1 to 9), and of the racemic prostaglandin F2α of formula XVI from the tetrahydroxy compound of formula II (Preparations 10 to 16).

Preparation 1

Racemic 1β,5β-bicyclo-(3.3.0)-oct-2-ene-6α,8α-dicarboxylic acid (V)—(a) A solution of 30 g. of racemic endo-3a,4,7,7a-tetrahydro-4,7-methanoindene (III) in 1000 ml. of ethyl acetate at 0° C. was ozonized with approx. 2% ozone-oxygen for 24 hours. After flushing with oxygen the solvents were removed *in vacuo* and the residue was dissolved in 700 ml. acetone with vigorous mechanical stirring. An excess of 8N chromic acid-sulphuric acid (Jones, J. Chem. Soc. 1953, 2548) was then added in aliquots to the stirred solution at 0° C. A little water was then added and most of the acetone removed *in vacuo*. The residue was extracted 3 times with ether and the ether back extracted with 2 times 2N sodium hydroxide. Acidification of the sodium hydroxide extracts with conc. hydrochloric acid and extraction 3 times with ether yielded the crude acidic material. After one crystallisation from ethyl acetate there was obtained 8 g. of the desired product (V) having a melting point of 199–204° C., infared absorption max. (KBr) 2500–3400, 1690 cm.$^{-1}$.

*Analysis.*—Calcd. for $C_{10}H_{12}O_4$ (percent): C, 61.2; H, 6.2. Found (percent): C, 61.2; H, 6.15.

(b) In an improved process in order to obviate the necessity of replacing the solvent subsequent to the ozonolysis, the ozonolysis was conducted with acetone as solvent.

Preparation 2

Racemic 5exo, 6exo - dihydroxy - endo-3a,4,5,6,7,7a-hexahydro-4,7-methanoidene (IV):

(a) A vigorously stirred 0° C. solution of 32 g. of racemic endo - 3a,4,7,7a - tetrahydro-4,7-methanoindene (III) in 1800 ml. ethanol was treated portionwise with a solution of 39 g. of potassium permanganate in 600 ml. water. After 2 hours the reaction mixture was filtered and the filtrate concentrated *in vacuo*. Addition of water and extraction 4 times with ether yielded the crude product which crystallised from light-petroleum (b.p. 80–100° C.) to give 11.3 g. of the desired product (IV) having a melting point of 48–51° C., infrared absorption max. (KBr) 3200–3500 cm.$^{-1}$.

*Analysis.*—Calcd. for $C_{10}H_{14}O_2$ (percent): C, 72.3; H, 8.5. Found (percent): C, 72.45; H, 8.5.

(b) In a modification of the process conducted in isopropanol at 20–25° C. 32 g. of (III) with 20.8 g. potassium permanganate afforded 12.2 g. of the desired product (IV).

Preparation 3

Racemic 6α,8α - diformyl-1β,5β-bicyclo-(3.3.0)-oct-2-ene (VI):

A mixture of racemic 5exo, 6exo-dihydroxy-endo-3a,4,5,6,7,7a - hexahydro-4,7-methanoindene-(IV) (30 g.), 50 ml., of water, 100 ml. ether, and 50 g. potassium periodate was vigorously stirred for 1 hour with cooling in a cold water bath. The ether layer was separated and the aqueous residue extracted twice with ether. Evaporation of the ether gave 28.6 g. of the desired product (VI) having a melting point of 36–42° C. A portion recrystallised from light-petroleum (b.p. 60–80° C.) had a melting point of 45.5–46° C., infrared absorption max. (CCl$_4$) 2810, 2720, 1725 cm.$^{-1}$.

*Analysis.*—Calcd. for $C_{10}H_{12}O_2$ (percent): C, 73.1; H, 7.4. Found (percent): C, 73.4; H, 7.6.

Preparation 4

Racemic 1β,5β - bicyclo-(3.3.0)-oct-2-ene 6α,8α-dicarboxylic acid (V) 4.83 g. of racemic 6α,8α-diformyl-1β,5β-bicyclo-(3.3.0)-oct-2-ene (VI) in 250 ml. acetone at 0° C. was oxidised by portionwise addition of an excess of 8N chromic acid-sulphuric acid with stirring. Most of the acetone was removed *in vacuo*, a little water added, and the product extracted 3 times with ether. Evaporation of the ether gave crude material which after crystallisation from ethyl acetate yielded 4.00 g. of the desired product (V) having a melting point of 201–205° C. and shown to be identical to the material of Preparation 1.

Preparation 5

Racemic 6α,8α - diacetyl-1β,5β-bicyclo-(3.3.0)-oct-2-ene (VII; R+Me):

Method I: A solution of methyl lithium was prepared under nitrogen by adding 14.2 g. methyl iodide in dry ether (13 ml.) to lithium (1.05 g.) in 25 ml. dry ether at such a rate as to maintain reflux. The resulting cooled solution was added under nitrogen to 0.50 g. of racemic 1β,5β - bicyclo-(3.3.0)-oct-2-ene-6α,8α-dicarboxylic acid (V) in 25 ml. of freshly dried tetrahydrofuran. After being stirred for ½ hour the reaction mixture was stoppered and stirred for 65 hours, poured into 150 ml. of saturated ammonium chloride and extracted 4 times with ether. Evaporation of the ether gave 0.326 g. of the desired product (VII; R=Me) having a melting point of 110–121° C. A portion of the product crystallised from ether had a melting point of 121.5–122.5° C., infrared absorption max. (CHCl$_3$) 1705 cm.$^{-1}$.

*Analysis.*—Calcd. for $C_{12}H_{16}O_2$ (percent): C, 74.9; H, 8.4. Found (percent): C, 74.8; H, 8.4.

Method II: A solution of methyl magnesium iodide was prepared by adding dropwise 26 g. of methyl iodide in 30 ml. dry ether to a suspension of 4.3 g. magnesium in 50 ml. ether stirred at 0° C. To the resultant reagent was added portionwise with vigorous stirring at 0° C. a solution of 10 g. of racemic 6α,8α - diformyl-1β,5b-bicyclo-(3.3.0)-oct-2-ene (VI) in 100 ml. dry ether. The reaction was then refluxed for 3 hours, cooled to 0° C. and saturated ammonium chloride (50 ml.) added carefully with stirring. To the cold mixture was added 150 ml. 2N hydrochloric acid, the ether layer was separated and the aqueous layer extracted 4 times with chloroform.

Evaporation of the combined organic layers gave 14.1 g. of crude racemic 6α,8α-di(1'-hydroxyethyl)1β,5β-bicyclo-(3.3.0)-oct-2-ene (VIII; R=Me) which was shown by thin layer chromatography to be a mixture:

(a) The 14.1 g. of crude racemic 6α,8α-di(1'-hydroxyethyl)-1β,5β-bicyclo-(3.3.0)-oct-2-ene was stirred at 10° C. with 500 ml. acetone and oxidised by the dropwise addition of an excess of 8N chromic acid-sulphuric acid. An equal volume of water was added and the product extracted 4 times with ether. The combined ether extracts were washed with 10% sodium hydroxide (200 ml.), water and evaporated to give the crude product. By crystallisation from ether there was obtained in two crops a total of 2.48 g. of racemic 6α,8α-diacetyl-1β,5β-bicyclo-(3.3.0)-oct-2-ene (VII; R=Me) having a melting point of 120–123.5° C. and shown by conventional procedures to be identical to the foregoing material.

(b) An improved yield (50%) of the desired product (VII; R=Me) was obtained by oxidation of 1.96 g. of (VIII; R=Me) in 40 ml. of methylene chloride with a mixture of 6 g. chromium trioxide and 9.49 g. pyridine in 150 ml. methylenechloride (solvents and reagents should be dry). The reaction mixture was washed with N sodium hydroxide solution (3×100 ml.), 2N hydrochloric acid (2×100 ml.) and saturated sodium bicarbonate solution (100 ml.). After removal of solvents the product was recrystallised.

Preparation 6

Racemic 6α,8α-diacetyl 2β,3β,-dihydroxy-1β,5β-bicyclo-(3.3.0)-octane (IX; R=Me):

(a) A stirred mixture of racemic 6α,8α-diacetyl-1β,5β-bicyclo-(3.3.0)-oct-2-ene (VII; R=Me) (10 g.) 200 ml. of pure dioxan, 80 ml. of water, 7.9 g. of potassium chlorate and a few small crystals of ocmium tetroxide was heated on an oil bath at 85° C. for 5 hours. Solvents were removed *in vacuo* and the residue was well extracted with chloroform with drying by anhydrous sodium sulphate. Evaporation of the chloroform extracts gave a crude product which was washed with 3 times 250 ml. ether, leaving as residue 8.7 g. of the desired product (IX; R=Me) having melting point 181–185° C., infrared absorption max. (KBr) 3200–3500, 1700 cm.$^{-1}$ and shown to be a single spot on a silica thin layer plate with 7% methanol-chloroform. (b) In a modification of the process carried out using tertiary butanol (65 ml.) in place of dioxan, 10 g. of (VII; R=Me) gave 8.5 g. of the desired product (IX; R=Me) after 11½ hours.

Preparation 7

Racemic 2β,3β - diacetoxy-6α,8α-diacetyl-1β,5β-bicyclo-(3.3.0)-octane (XI; R=R'=Me):

(a) 8.7 g. of racemic 6α,8α-diacetyl 2β,3β-dihydroxy-1β,5β-bicyclo-(3.3.0)-octane (IX; R=Me) was stirred for 2 hours at ambient temperature with 50 ml. of pyridine and 50 ml. acetic anhydride. 250 ml. of water was added and solvents removed *in vacuo*. Crystallisation of the residue from ether/methylene chloride after a charcoal decolourisation gave, in two crops, 8.4 g. of the desired product (X; R=R'=Me) having a melting point of 123–125° C., infrared absorption max. (CHCl$_3$) 1740, 1710 cm.$^{-1}$.

Analysis.—Calcd. for C$_{16}$H$_{22}$O$_6$ (percent): C, 61.9; H, 7.15. Found (percent): C, 62.15; H, 7.2.

The structure and stereochemistry were totally confirmed by an N.M.R. spectrum.

(b) On the large scale, removal of the last traces of pyridine and acetic acid *in vacuo* is impractical and on prolonged heating the product may be epimerised. Preferably after the removal of the bulk of solvent, the concentrate is dissolved in methylenechloride, washed with 2N hydrochloric acid and saturated sodium bicarbonate solution. The organic phase is dried and evaporated.

Preparation 8

Racemic 2β,3β,6α,8α - tetraacetoxy - 1β,5β - bicyclo-(3.3.0)-octane (XI; R=R'=Me):

(a) 15 g. of racemic 2β,3β-diacetoxy-6α,8α-diacetyl-1β,5β-bicyclo-(3.3.0)-octane (X; R=R'=Me) and 39.2 g. of *m*-chloro perbenzoic acid in 59 ml. methylene chloride were refluxed for 13 days. The reaction mixture was diluted with methylene chloride and washed with a mixture of 10% aqueous sodium sulphite (100 ml.) and saturated potassium carbonate (100 ml.) with vigorous shaking until all the solids had dissolved. The organic layer was now washed with aqueous potassium carbonate (100 ml. of a saturated solution plus 100 ml. water), water and dried on sodium sulphate. Evaporation of the solvent yielded 16.7 g. of a crude product which crystallised from aqueous methanol to give 11.37 g. of a material m.p. 118–127° C. This was recrystallised from ether-methylene chloride-light petroleum (b.p. 60–80° C.) yielding 8.86 g. of the desired product (XI—R=R'=Me), m.p. 130–131° C., infrared absorption max. (CHCl$_3$) 1735 cm.$^{-1}$.

Analysis.—Calcd. for C$_{16}$H$_{22}$O$_8$ (percent): C, 56.1; H, 6.5. Found (percent): C, 56.2; H, 6.5.

Nuclear magnetic resonance analysis showed the structure to be correct.

(b) 2.3 g. of maleic anhydride was added to 1.7 ml. of 29% hydrogen peroxide and the mixture stirred at ambient temperature for ½ hour. Following the removal of water at ambient temperature and reduced pressure the residual permaleic acid was stirred and heated under reflux with 0.93 g. of (X; R=R'=Me) in 10 ml. methylene chloride for 18 hours. A similar quantity of permaleic acid was added and heating continued for a further 18 hours. Following filtration to remove excess acid and washing as above, evaporation of the solvent yielded 0.7 g. of the crude product. Recrystallisation from ether-methylene chloride-light petroleum (b.p. 60–80° C.) yielded product m.p. 129.5–130.5° C., shown by I.R. and N.M.R. spectroscopy and by thin layer chromatography to be identical to the foregoing material. The maleic acid recovered from this process is readily reconverted to permaleic acid for reuse).

Preparation 9

Racemic 2β,3β,6α,8α - tetrahydroxy - 1β,5β - bicyclo-(3.3.0)-octane (II):

(a) A stirred solution of 0.5 g. of racemic 2β,3β,6α,8α-tetraacetoxy - 1β,5β - bicyclo - (3.3.0) - octane - (XI; R=R'=Me) in 25 ml. methanol was treated with 1 g. of anhydrous potassium carbonate at room temperature for 2 hours. 10 g. of Amberlite resin CG 120 (acid washed) was added and after ¼ hour the solution was filtered and evaporated to dryness. The residue was washed 4 times with chloroform yielding as the new reisdue 248 mg. of the desired product (II). This oily product was crystallised from acetonitrile-methanol with trituration to give an amorphous solid (II) m.p. 110–114° C., infrared absorption max. (KBr) 3200–3500, 1170, 1110, 1045, 845 cm.$^{-1}$, N.M.R. spectrum (D$_2$O; Varian T60, N.M.R. spectrometer) 1.2–3.2. (six proton multiplet), (3.8–4.5δ) (four proton multiplet).

Analysis.—Calcd. for C$_8$H$_{14}$O$_4$ (percent): C, 55.2; H, 8.1. Found (percent): C, 55.2; H, 8.1.

(b) In an improved process it was found possible to employ only 1/20 of the amounts of potassium carbonate and Amberlite resin as employed in (a).

Preparation 10

Racemic aldehyde (XII):

A solution of 2β,3β,6α,8α-tetrahydroxy-1β,5β-bicyclo-(3.3.0)-octane (II) (900 mg.) in 16 ml. of 10% aqueous t-butanol was stirred with 0.68 g. of potassium carbonate and 1.80 g. of sodium periodate under nitrogen for 1½ hr. 8 ml. of alumina-washed chloroform was added and the reaction filtered through a column of silica gel (15 g.), washing through with 33% chloroform-t-butanol under a pressure of nitrogen. Evaporation of the first eluate from the column yielded 880 mg. of the oily unstable aldehyde (XII). Because of the instability of the aldehyde (XII) it was characterised simply by thin layer chromatography on a silica plate, using 25% methanol-chloroform; the approximate R$_f$ was 0.6. The aldehyde (XII) was always used immediately for the next operation.

Preparation 11

Racemic enone (XIII) and 12-iso enone (XIV):

1.248 g. of dimethyl-(2-oxoheptyl)-phosphonate in 48 ml. of dry dimethoxy ethane at 5° C. was treated portionwise with 244 mg. of 50% sodium hydride dispersion in mineral oil. The mixture was allowed to warm to room temperature with very vigorous shaking during 1 hr. by which time a white gel had formed. The gel was transferred with swirling to a solution of 880 mg. of the freshly prepared aldehyde (XII) in 8 ml. dry dimethoxy ethane, and the resultant mixture stirred ½ hr. at room temperature. Solvent was removed *in vacuo* and the residue applied to one 20 x 20 cm., 2 mm. thick silica TLC plate. After developing by continuous elution overnight with chloroform/methanol (40:1) the product bands were located under a U.V. light. Elution with ethyl acetate from separate regions gave 444 mg. of the enone (XIII) (lower R$_f$) and 110 mg. of the 12-iso enone (XIV) (higher R$_f$).

The lower enone (XIII) had infrared absorption max. (CHCl$_3$) 3200–3500, 1690, 1665, 1625 cm.$^{-1}$, ultra violet absorption max. (EtOH) ca. 235 mμ (ε 12,000), and peaks in the nuclear magnetic resonance spectrum (CDCl$_3$) (determined at 60 mHz. with TMS=0δ) 6.17 (doublet, J=16 c.p.s.) and 6.80δ (quartet, J=7.5 and 16 c.p.s.). The molecular weight, determined by mass spectrometry, was 268; calcd. for C$_{15}$H$_{24}$O$_4$, 268.

The upper 12-iso enone (XIV) had infrared absorption max. ($CHCl_3$) 3200–3500, 1690 (sh.), 1660, 1620 cm.$^{-1}$, ultraviolet absorption max. (EtOH) ca. 235 m$\mu$ ($\epsilon$ 11,000), and peaks in the nuclear magnetic resonance spectrum ($CDCl_3$) 6.25 (doublet, J=16 c.p.s.) and 7.15$\delta$ (complex quartet). The molecular weight, determined by mass spectrometry, was 268; calcd. for $C_{15}H_{24}O_4$, 268.

Preparation 12

Racemic trichloroethoxy derivative (XIIIa):

A solution of 1.03 g. of racemic enone (XIII) in 25 ml. trichloroethanol was treated with 9 mg. p-toluene sulphonic acid for 2 hr. at ambient. 2 ml. of saturated aqueous sodium bicarbonate was added and the mixture shaken vigorously for 20 min. Anhydrous sodium sulphate was added and the mixture filtered, washing the residue with methylene chloride. Evaporation of the combined filtrates gave 1.63 g. of the trichloroethoxy derivative (XIIIa) having infrared absorption max. (film) 3250–3550, 1690 (sh), 1665, 1625, 810 and 720 cm.$^{-1}$, ultraviolet absorption max. (EtOH) ca. 230 m$\mu$ ($\epsilon$ 10,000), and peaks in the nuclear magnetic resonance spectrum ($CDCl_3$) 6.20 (complex doublet), 6.75 (multiplet) and 4.15$\delta$ (broad singlet). The molecular weight and chlorine content were confirmed by mass spectrometry; major peaks occur in the mass spectrum at m/e 251 (M—$CCl_3CH_2O$) and at m/e 99

($CH_3CH_2CH_2CH_2CH_2CO$).

Preparation 13

Racemic dihydroxy compound (XVa):

1.55 g. of the racemic trichloroethoxy derivative (XIIIa) in 20 ml. of 30% aqueous ethanol was treated with 0.2 g. sodium borohydroxide at room temperature for ¾ hr. A slight excess of acetic acid was added followed by 5 ml. of saturated sodium bicarbonate. Three extractions with methylene chloride yielded 1.38 g. of the desired product (XVa) having infrared absorption max. (film) 3150–3550, 807 and 720 cm.$^{-1}$. and peaks in the nuclear magnetic resonance spectrum ($CDCl_3$) 5.55 (broad) and 4.15$\delta$ (broad singlet). In the mass spectrum there was a major peak at m/e 253

(M—$CCl_3CH_2O$).

Preparation 14

Racemic diacetate (XVb):

1.33 g. of the racemic dihydroxy compound (XVa) was dissolved in 5 ml. pyridine and 5 ml. acetic anhydride at room temperature for 2½ hr. 12½ ml. of distilled water was added and the mixture evaporated to dryness under reduced pressure, yielding 1.49 of the desired product (XVb) having infrared absorption max. (film) 1735, 805 and 720 cm.$^{-1}$, and peaks in the nuclear magnetic resonance spectrum ($CDCl_3$) 4.0–5.6 (broad) and 2.02$\delta$ (singlet). The crude material (XVb) moved essentially as a single spot on a silica TLC plate with 7% methanol-chloroform as solvent; the $R_f$ was 0.75 approx.

Preparation 15

Racemic hemi-acetal (XVc):

1.92 g. of racemic diacetate (XVb) in 7 ml. of acetic acid and 4 ml. of water was stirred vigorously with 0.5 g. zinc dust for 35 min. at room temperature. The reaction was diluted with methylene chloride (30 ml.) and filtered, washing the residues with methylene chloride. The combined filtrates were washed with 175 ml. of saturated sodium bicarbonate solution and the aqueous carbonate solution back extracted with three times methylene chloride.

Evaporation of the combined, dried methylene chloride layers gave 1.64 g. of crude product which was fractionated on two 20 x 20 cm. 2 mm. thick silica preparative thin layer chromatography plates, using a continuous elution with 1% methanol-chloroform for 4 hr. The band containing the product (XVc) was just above the baseline and was located by edge development with iodine. Elution from the silica with ethyl acetate then gave 0.56 g. of the desired product (XVc) having infrared absorption max. (film) 3300–3550, 1735, 1370, 1240 and 1015 cm.$^{-1}$, and peaks in the nuclear magnetic resonance spectrum

($CDCl_3$+$D_2O$)

4.4–5.6 (broad) and 2.03 (singlet with shoulder). The product (XVc) moved as a single spot on several thin layer chromatography systems, for example $R_f$ 0.35 (silica plate, 4% methanol-chloroform solvent), $R_f$ 0.5. (silica plate, ethyl acetate solvent).

From higher $R_f$ regions in the preparative layer chromatography described above there was obtained 0.61 g. of recovered starting material (XVb) which could be used again.

Preparation 16

Racemic prostaglandin F2$\alpha$(XVI):

362 mg. of 50% sodium hydride dispersion and 1.85 ml. dry dimethyl sulphoxide were heated under nitrogen on an oil bath at 75–85° C. for 1 hr. The resultant solution of dimsyl sodium was frozen in an ice/water bath and a solution of 1.65 g. 5-triphenylphosphoniovaleric acid in 3.7 ml. dry dimethyl sulphoxide was added. The mixture was allowed to warm to room temperature when the ylid was formed, judged by the appearance of a red colour. After swirling for 10 min. the mixture was refrozen in the ice/water bath and a solution of 436 mg. of racemic hemi-acetal (XVc) in 2.4 ml. dry dimethyl sulphoxide was added, washing in the hemi-acetal (XVc) with a further 2.4 ml. of dry dimethyl sulphoxide.

The reaction was now allowed to warm to room temperature with swirling and warming. After ½ hr. at ambient 30 ml. distilled water was added and the reaction extracted with three times methylene chloride. The combined methylene chloride layers were back extracted with distilled water, and the combined aqueous layers were then acidified with 36 ml. of 2N. hydrochloric acid.

Extraction with three times methylene chloride yielded acidic products of the reaction. These were treated with an excess of methanolic potassium hydroxide in benzene to hydrolyse any residual acetate groupings and the acidic products were again recovered after acidification with 2N hydrochloric acid and extraction into methylene chloride. These acidic products were fractionated on silica preparative layer plates using benzene/dioxan/acetic acid (40:10:1) as solvent with continuous elution for 18 hr. From the front half of the plates there was obtained 144 mg. of substantially pure racemic 15-epi prostaglandin F2$\alpha$; from the rear half of the plates was obtained by washing with 25% methanol-methylene chloride 62 mg. of pure racemic prostaglandin F2$\alpha$.

Racemic prostaglandin F2$\alpha$ had infrared absorption max. (KBr) 2500–3600, 1710 and 970 cm.$^{-1}$, and peaks in the nuclear magnetic resonance spectrum ($CD_3OD$) 5.50 (broad), 3.6–4.25, and 0.90$\delta$ (triplet). Significant peaks in the mass spectrum were at m/e 318 (M—2$H_2O$), 264 (M—$H_2O$—$C_5H_{12}$), 194 and 137.

The synthetic racemic prostaglandin F2$\alpha$ was indistinguishable from natural F2$\alpha$ by infrared and mass spectrometry, and VPC when derivatised as the trimethylsilyl ethers of the methyl ester. Identity was also established using several sensitive thin layer chromatography systems (e.g. Andersen, J. Lipid Res., 1969, 10, 316).

The synthetic racemic prostaglandin F2$\alpha$ had the expected level of biological activity when assayed against the natural F2$\alpha$ on smooth muscle strips of rat fundus.

The invention also includes the Prostaglandin compounds of this invention which are produced from the novel tetrol of Formula I when formulated as pharmaceutical compositions with carriers or diluents in such manner as is well known in the art.
What is claimed is:
1. A racemic compound having the formula
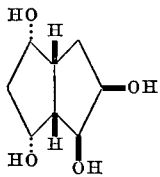
II
References Cited
Vidal et al., "Comptes Rendus Acad. Sci de Pares," Tome 274, Feb. 28, 1972, pp. 905–908.
JOSEPH E. EVANS, Primary Examiner
D. B. SPRINGER, Assistant Examiner
U.S. Cl. X.R.
260—346.2 R, 468 D, 468 R, 514 D, 514 G, 598, 666 PY; 424—317